(12) United States Patent
Huh et al.

(10) Patent No.: US 10,479,211 B2
(45) Date of Patent: Nov. 19, 2019

(54) REGENERATIVE BRAKING APPARATUS FOR VEHICLE AND METHOD USING THE SAME

(71) Applicants: HYUNDAI MOTOR COMPANY, Seoul (KR); KIA MOTORS CORPORATION, Seoul (KR)

(72) Inventors: Jee Wook Huh, Bucheon-si (KR); Kyoungcheol Oh, Suwon-si (KR); Gwang Il Du, Incheon (KR); Eunbae Koh, Seoul (KR); Teh Hwan Cho, Anseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 152 days.

(21) Appl. No.: 15/611,118

(22) Filed: Jun. 1, 2017

(65) Prior Publication Data
US 2018/0126862 A1 May 10, 2018

(30) Foreign Application Priority Data
Nov. 8, 2016 (KR) .................. 10-2016-0148375

(51) Int. Cl.
*B60T 13/74* (2006.01)
*B60L 11/18* (2006.01)
(Continued)

(52) U.S. Cl.
CPC ............. *B60L 11/1861* (2013.01); *B60L 7/18* (2013.01); *B60L 7/26* (2013.01); *B60L 15/2009* (2013.01);
(Continued)

(58) Field of Classification Search
CPC .... B60L 7/18; B60L 11/1861; B60L 11/1803; B60T 8/172; B60T 13/586; H02P 3/14
(Continued)

(56) References Cited

U.S. PATENT DOCUMENTS 8,437,937 B2* 5/2013 Ganley ................ B60T 1/10
303/152
9,561,726 B2* 2/2017 Kim ..................... B60L 11/08
(Continued)

FOREIGN PATENT DOCUMENTS

KR 10-2008-0037220 A 4/2009
KR 10-2014-0085137 7/2014
(Continued)

*Primary Examiner* — Bradley T King
(74) *Attorney, Agent, or Firm* — Brinks Gilson & Lione (57) ABSTRACT

A regenerative braking control apparatus of a vehicle may include: a drive motor; a battery for providing driving voltage to the drive motor; a data detector for detecting a driving state information of the vehicle; and a vehicle controller generating a total braking amount based on the driving state information. In particular, the vehicle controller generates a regenerative braking possible amount by using a generatable power of the drive motor and a chargeable power of the battery, performs a regenerative braking when the regenerative braking possible amount is greater than the total braking amount, and also prepares a hydraulic pressure braking based on the regenerative braking possible amount and a regenerative braking amount based on the regenerative braking.

13 Claims, 5 Drawing Sheets

(51) Int. Cl.
*B60L 7/18* (2006.01)
*H02P 3/14* (2006.01)
*B60T 1/10* (2006.01)
*B60L 7/26* (2006.01)
*B60L 15/20* (2006.01)
*B60L 50/15* (2019.01)
*B60L 50/16* (2019.01)
*B60L 58/12* (2019.01)
*B60T 8/172* (2006.01)

(52) U.S. Cl.
CPC .............. *B60L 50/15* (2019.02); *B60L 50/16* (2019.02); *B60L 58/12* (2019.02); *B60T 1/10* (2013.01); *H02P 3/14* (2013.01); *B60L 2240/14* (2013.01); *B60L 2250/26* (2013.01); *B60L 2260/20* (2013.01); *B60T 8/172* (2013.01); *B60T 2260/04* (2013.01); *B60T 2270/604* (2013.01)

(58) Field of Classification Search
USPC ........................................ 303/152, 3; 701/22
See application file for complete search history.

(56) References Cited

U.S. PATENT DOCUMENTS

| | | | | |
|---|---|---|---|---|
| 2006/0125317 | A1* | 6/2006 | Kokubo | B60K 6/445 303/152 |
| 2015/0094889 | A1* | 4/2015 | Oh | B60T 13/74 701/22 |
| 2015/0183424 | A1* | 7/2015 | Kim | B60W 20/40 701/22 |
| 2015/0251657 | A1* | 9/2015 | Johri | B60L 7/10 701/22 |
| 2015/0321564 | A1* | 11/2015 | Huh | B60W 10/188 701/22 |
| 2016/0031325 | A1* | 2/2016 | Kim | B60L 11/08 701/70 |
| 2016/0082951 | A1* | 3/2016 | Ohn | F02N 11/0862 701/22 |
| 2016/0105132 | A1* | 4/2016 | Kim | B60L 7/10 701/22 |
| 2016/0159225 | A1* | 6/2016 | Nakatsu | B60L 7/26 701/71 |
| 2016/0244034 | A1* | 8/2016 | Huh | B60K 31/02 |
| 2017/0212013 | A1* | 7/2017 | Ishii | G01M 17/007 |
| 2017/0232849 | A1* | 8/2017 | Yamamoto | B60L 7/26 303/15 |
| 2018/0056790 | A1* | 3/2018 | Symanow | B60L 50/61 |
| 2018/0264949 | A1* | 9/2018 | Kaneko | B60T 8/72 |
| 2019/0039579 | A1* | 2/2019 | Ohkubo | B60T 8/17 |

FOREIGN PATENT DOCUMENTS

| | | |
|---|---|---|
| KR | 10-2014-009754 | 9/2014 |
| KR | 10-1610121 | 4/2016 |
| KR | 10-2016-0056530 | 5/2016 |
| KR | 10-1664076 | 10/2016 |

* cited by examiner

REGENERATIVE BRAKING APPARATUS FOR VEHICLE AND METHOD USING THE SAME

CROSS-REFERENCE TO RELATED APPLICATION

This application claims priority to and the benefit of Korean Patent Application No. 10-2016-0148375, filed on Nov. 8, 2016, which is incorporated herein by reference in its entirety.

FIELD

The present disclosure relates to a regenerative braking control apparatus of a vehicle and a method that can primarily control a regenerative braking.

BACKGROUND

The statements in this section merely provide background information related to the present disclosure and may not constitute prior art.

According to a continuous demand for improvement of fuel efficiency for a vehicle and stricter regulations of discharge gas of countries, a demand for an environmentally-friendly vehicle has been increased, and a hybrid vehicle has been provided as a realistic alternative for the demand.

The hybrid electric vehicle is a vehicle using two or more power sources. Two or more power sources may be combined by various schemes. Here, as the power source, a combination of a gasoline engine (or a diesel engine) using traditional fossil fuel and a motor/generator driven by electrical energy is used. The hybrid vehicle may provide appropriate output torque depending on how the two power sources (i.e., the engine and the motor) are harmoniously operated.

The hybrid vehicle provides an electric vehicle (EV) mode in which the vehicle runs by a torque of only the motor, a hybrid electric vehicle (HEV) mode in which the vehicle runs by the sum of an engine torque and a motor torque according to whether the engine clutch couples, and a regenerative braking (RB) mode which recovers braking and inertial energy generated when braking applies to the vehicle or when the vehicle is driven by inertia energy of the vehicle. In the RB mode, the braking and inertial energy runs the driving motor and power is generated such that the recovered braking and inertial energy charges a battery.

A regenerative braking system uses a portion of a braking force for power generation upon braking a vehicle, charges generated electrical energy in a battery, and uses a portion of kinetic energy from a driving speed of a vehicle as energy desired for driving a generator (i.e., drive motor/generator). By extending a travel distance of a vehicle by such a regenerative braking system, fuel efficiency can be improved and discharge of a noxious gas can be reduced.

When the regenerative braking is controlled in collaboration with the hydraulic pressure braking, the hydraulic pressure braking is primarily performed in order to obtain braking stability and initial braking hydraulic pressure. According to the conventional art, since it is very difficult to predict a regenerative braking amount and a reliability of the regenerative braking amount is very low, a hydraulic pressure braking is primarily performed.

There is a limitation for retrieving energy through the regenerative braking when the hydraulic pressure braking is primarily performed, fuel consumption is deteriorated.

The above information disclosed in this Background section is only for enhancement of understanding of the background of the present disclosure and therefore it may contain information that does not form the prior art that is already known to a person of ordinary skill in the art.

SUMMARY

The present disclosure provides a regenerative braking control apparatus of a vehicle and a method that can primarily control a regenerative braking when a regenerative braking is controlled in collaboration with a hydraulic pressure braking.

Further, the present disclosure provides a regenerative braking control apparatus of a vehicle and a method that can early enter a regenerative braking by calculating a regenerative braking possible amount.

In one form of the present disclosure, a regenerative braking control apparatus of a vehicle may include: a drive motor; a battery configured to provide driving voltage to the drive motor; a data detector configured to detect a driving state information of the vehicle; and a vehicle controller configured to: generate a total braking amount based on the driving state information, generate a regenerative braking possible amount based on a generatable power of the drive motor and a chargeable power of the battery, perform a regenerative braking when the regenerative braking possible amount is greater than the total braking amount, and prepare a hydraulic pressure braking based on the regenerative braking possible amount and a regenerative braking amount based on the regenerative braking.

The vehicle controller may calculate a calculation value based on the regenerative braking possible amount and the regenerative braking amount, and prepare the hydraulic pressure braking by supplying a hydraulic pressure to a brake cylinder connected with a brake pad when the calculation value is less than a reference value.

The vehicle controller may control a brake system to supply the hydraulic pressure to the brake cylinder connected with the brake pad until the brake pad and a brake disk are a state of a kiss point.

When the vehicle controller receives a changed driving state information from the data detector, the vehicle controller may update the total braking amount based on the changed driving state information, and calculate a hydraulic pressure braking amount based on the updated total braking amount and the regenerative braking amount when the regenerative braking possible amount is less than the updated total braking amount.

The vehicle controller may calculate the hydraulic pressure braking amount by subtracting the regenerative braking amount from the updated total braking amount, and perform the hydraulic pressure braking based on the hydraulic pressure braking amount.

The vehicle controller may calculate the regenerative braking possible amount by using the generatable power of the drive motor, the chargeable power of the battery and the consumed power by the electrical devices The vehicle controller may calculate a hand over ratio when a shift stage is changed in a transmission, and calculate the regenerative braking possible amount based on the generatable power of the drive motor, the chargeable power of the battery, the hand over ratio, and the consumed power by the electrical devices.

The electrical devices may include at least one of a HSG (hybrid starter and generator), a FATC (full automatic temperature control system) and a LDC (low-voltage DC-DC Converter).

The vehicle controller may perform the regenerative braking and the hydraulic pressure braking when the regenerative braking possible amount is equal to or less than the total braking amount.

In another form of the present disclosure, a method of controlling regenerative braking of a vehicle may include: calculating, by a vehicle controller, a total braking amount based on a driving state information; calculating, by the vehicle controller, a regenerative braking possible amount by using a generatable power of the drive motor and a chargeable power of the battery; determining, by the vehicle controller, whether the regenerative braking possible amount is greater than the total braking amount; performing, by the vehicle controller, the regenerative braking when the regenerative braking possible amount is greater than the total braking amount; and preparing, by the vehicle controller, a hydraulic pressure braking based on a regenerative braking amount based on the regenerative braking possible amount and the regenerative braking.

According to an exemplary form of the present disclosure, since the regenerative braking is primarily performed when the regenerative braking is controlled in collaboration with the hydraulic pressure braking, retrieving amount of energy is increased and thus fuel consumption is improved.

Further, since the regenerative braking is early entered by calculating the regenerative braking possible amount, the regenerative braking amount can be increased.

Effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The drawings to be described below and the following detailed description relate to one exemplary form of various exemplary forms for effectively explaining the characteristics of the present disclosure. Therefore, the present disclosure should not be construed as being limited to the drawings and the following description.

Further, in the description of the present disclosure, the detailed description of related well-known configurations and functions is not provided, when it is determined as unnecessarily making the scope of the present disclosure unclear. Further, the terminologies to be described below are ones defined in consideration of their function in the present disclosure and may be changed by the intention of a user or an operator or a custom. Therefore, their definition should be determined on the basis of the description of the present disclosure.

Further, in the following exemplary forms, the terminologies are appropriately changed, combined, or divided so that those skilled in the art can clearly understand them, in order to efficiently explain the main technical characteristics of the present disclosure, but the present disclosure is not limited thereto.

Figure 1:
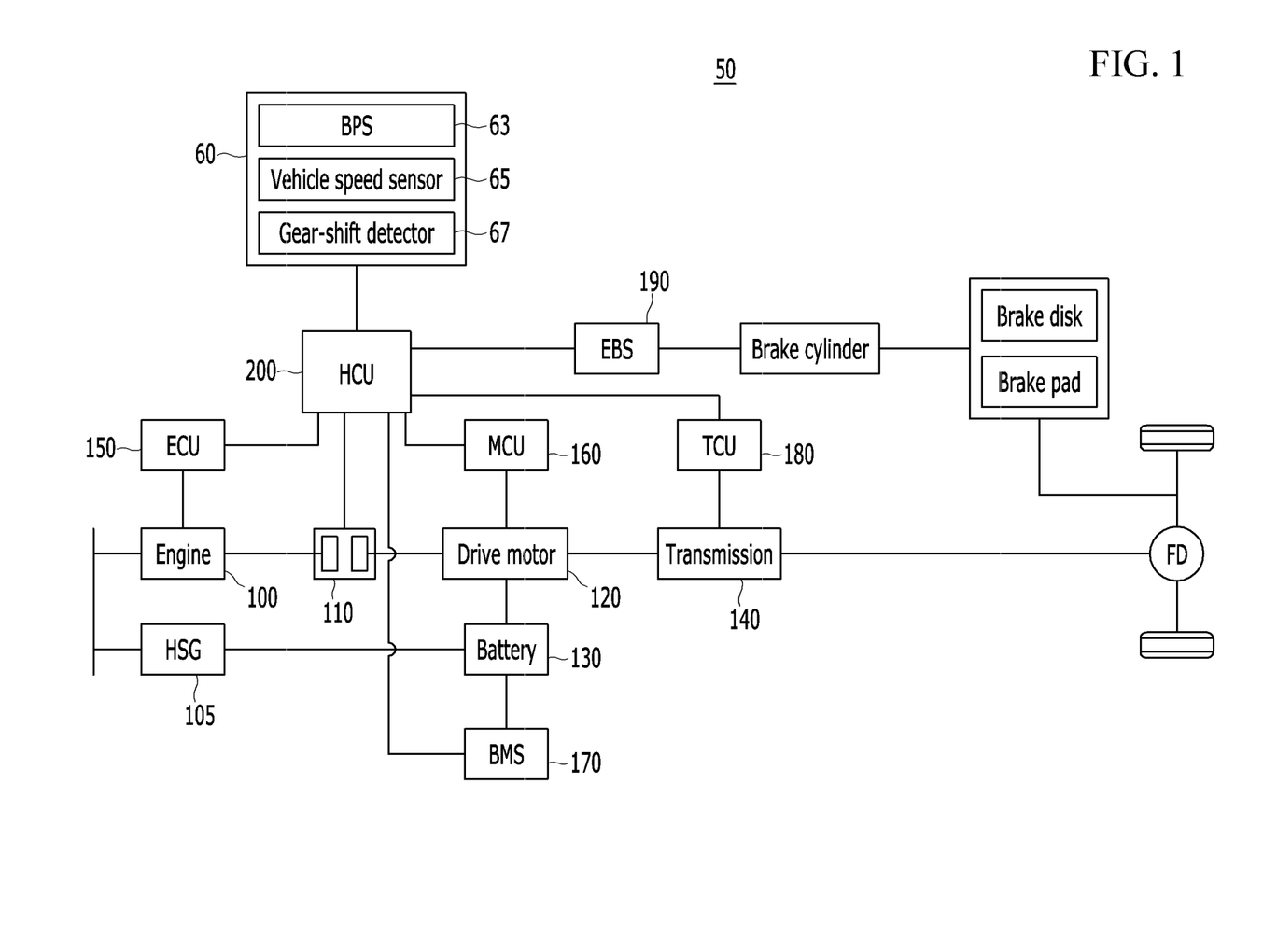
FIG. 1 is a block diagram illustrating a regenerative braking control apparatus of a vehicle.

FIG. 1 is a block diagram illustrating a regenerative braking control apparatus of a vehicle in one exemplary form of the present disclosure. FIG. 1 illustrates that a regenerative braking control apparatus is applied to a hybrid vehicle among environmentally-friendly vehicles for better comprehension and ease of description. Therefore, the regenerative braking control apparatus can be applied not only to the hybrid vehicle of FIG. 1 but also to other environmentally-friendly vehicles. Although the hybrid vehicle may be different from a fuel cell vehicle and an electric vehicle in a narrow sense, the hybrid vehicle in the present disclosure includes an electric vehicle (EV) and a fuel cell electric vehicle (FCEV).

Referring to FIG. 1, a regenerative braking control apparatus of a vehicle 50 may include: a data detector 60, an engine 100, an engine clutch 110, a drive motor 120, a battery 130, a transmission 140, an engine controller 150 (e.g., engine control unit: ECU), a motor controller 160 (e.g., motor control unit: MCU), a battery controller 170 (e.g., battery management system: BMS), a transmission controller 180 (e.g., transmission control unit: TCU), a brake controller 190 (e.g., electric brake system: EBS) and a hybrid vehicle controller 200 (e.g., hybrid control unit: HCU).

The data detector 60 detects a driving state information of the vehicle for controlling the regenerative braking. The driving state information detected by the data detector 60 is transmitted to the HCU 200. The data detector 60 may include a brake pedal position sensor 63 (e.g., BPS), a vehicle speed sensor 65 and a gear-shift detector 67.

The BPS 63 detects a degree of pressing a brake pedal by a driver. Here, the BPS 63 detects a position value of the brake pedal (the degree of pressing a brake pedal) and transmits the position value of the brake pedal to the HCU 200. When the brake pedal is fully pressed, the position value of the brake pedal may be 100%, and when the brake pedal is not pressed, the position value thereof may be 0%

The vehicle speed sensor 65 detects a vehicle speed. The vehicle speed sensor may be disposed in a driving wheel of the vehicle. The HCU 200 may calculate the vehicle speed by using a GPS signal received from a GPS (global position system).

The gear-shift detector 67 detects a gear-shift stage of the transmission 150.

The engine 100 is controlled by the ECU 150.

The engine clutch 110 is disposed between the engine 100 and the drive motor 120, selectively connects the engine 100 and the drive motor 120 and thus selectively delivers power between them. The engine clutch 110 is operated by the control signal of the HCU 200. That is, the engine clutch 110 connects or disconnects power delivery between the engine 100 and the drive motor 120 according to a conversion of an EV (electric vehicle) mode and a HEV (hybrid electric vehicle) mode.

The hybrid vehicle is operated by only the drive motor 120 when the engine clutch 110 is disengaged, and the hybrid vehicle is operated by the engine 100 and the drive motor 120 when the engine clutch 110 is engaged.

The drive motor 120 generates driving torque controlled by the MCU 160. The drive motor 120 may generate electric power during coasting or regenerative braking (i.e., operated as a generator), and the electric power is charged in the battery 130.

The battery 130 is comprised of a plurality of unit cell, and charges electric energy to supply driving voltage to the drive motor 120. The battery 130 supplies driving voltage to the drive motor 120 during the EV mode or the HEV mode, and charges electric energy generated by the drive motor 120 during regenerative braking.

The battery 130 may be charged by commercial power source.

The transmission 140 adjusts a shift ratio according to the control of the TCU 180, distributes an output torque that is added and applied through the engine clutch 110 according to a driving mode with a shift ratio, and transfers the output torque to the driving wheel, thereby enabling the vehicle to run.

The ECU 150 is connected with the HCU 200 through wired or wireless communication, and controls overall operations of the engine 100 based on a state of the engine 100, such as a desired torque of a driver, a coolant temperature, an engine speed, an opening amount of the throttle valve, an intake amount, an oxygen amount and an engine torque. The ECU 150 transmits the state of the engine 100 to the HCU 200.

The MCU 160 controls the drive motor 120 in accordance with the control signal of the HCU 200.

The BMS 170 detects an information including voltage, current, temperature of each cells of the battery, and controls charging state of the battery, and manages a SOC (State Of Charge) of the battery in accordance with the control signal of the HCU 200. The BMS 170 controls the voltage of the battery 130 such that the battery is not overdischarged under a minimum voltage limitation or the battery is not overcharged beyond a maximum voltage limitation.

The TCU 180 controls gear-ratio of the transmission according to the control signal of the ECU 150 and the MCU 160 and controls overall operation of the transmission 140, such as determining a regenerative braking amount. The TCU 180 transmits an operation state of the transmission 140 to the HCU 200.

When a gear-shift is changed in the transmission 150, the TCU 180 determines a hand over ratio according to a gear-shift stage of the transmission 150. Herein, the hand over ratio may mean a torque sharing ratio between a torque of previous gear-shift stage (i.e., gear-shift stage before changing gear-shift) and a torque of a target gear-shift stage (i.e., gear-shift stage after changing gear-shift). For example, the torque sharing ratio between 4-stage and 3-stage may be defined as 0-1 during the gear-shift stage is changed from 4-stage to 3-stage. At this time, the hand over ratio may be zero when 100% torque is supplied to the 4-stage and the hand over ratio may be one when 100% torque is supplied to the 3-stage. The TCU 180 transmits the hand over ratio to the HCU 200.

For such an object, in the TCU 180, one microprocessor or a plurality of microprocessors are provided, and the one microprocessor or the plurality of microprocessors may operate by a predetermined program for performing the method of controlling regenerative braking of the vehicle.

The EBS 190 calculates a total braking amount determined by a pedal stroke and a hydraulic pressure of a master cylinder when the driver decelerates the vehicle.

The EBS 190 performs a hydraulic pressure braking by controlling the brake cylinder to supply hydraulic pressure to each driving wheel in accordance with the control signal of the HCU 200. That is, the EBS 190 calculates a hydraulic pressure braking amount by using the total braking amount and the regenerative braking amount, and controls the hydraulic pressure supplied to the brake cylinder of the driving wheels according to the hydraulic pressure braking amount.

A brake system for the regenerative braking (AHB: Active Hydraulic Booster) in which regenerative brake efficiency is improved is applied to the EBS 190.

For such an object, in the EBS 190, one microprocessor or a plurality of microprocessors are provided, and the one microprocessor or the plurality of microprocessors may operate by a predetermined program for performing the method of controlling regenerative braking of the vehicle.

The HCU 200 is a superordinate controller that sets a hybrid running mode and that controls general operations of the environmentally-friendly vehicle. The HCU 200 integrally controls subordinate controllers that are connected through a communication network, collects and analyzes information of each subordinate controller, and executes cooperation control to control output torques of the engine 100 and the motor 120

The HCU 200 performs the regenerative braking and the hydraulic pressure braking based on the driving state information detected by the data detector 60. In detail, the HCU 200 receives the total braking amount from the EBS. The HCU 200 calculates the regenerative braking possible amount based in the generatable power of the drive motor and the chargeable power of the battery. The HCU 200 receives the generatable power of the drive motor from the MCU 160, and receives the chargeable power of the battery from the EBS 190. The HCU 200 controls the MCU 160 for performing the regenerative braking based on the regenerative braking possible amount and the total braking amount, and calculates the regenerative braking amount. The HCU 200 controls the EBS 190 for preparing the hydraulic pressure braking based on the regenerative braking possible amount and the regenerative braking amount.

For such an object, in the HCU 200, one microprocessor or a plurality of microprocessors are provided, and the one microprocessor or the plurality of microprocessors may operate by a predetermined program for performing the method of controlling regenerative braking of the vehicle.

Hereinafter, a method of controlling regenerative braking of a vehicle will be described in detail with reference to accompanying drawings.

Figure 2:
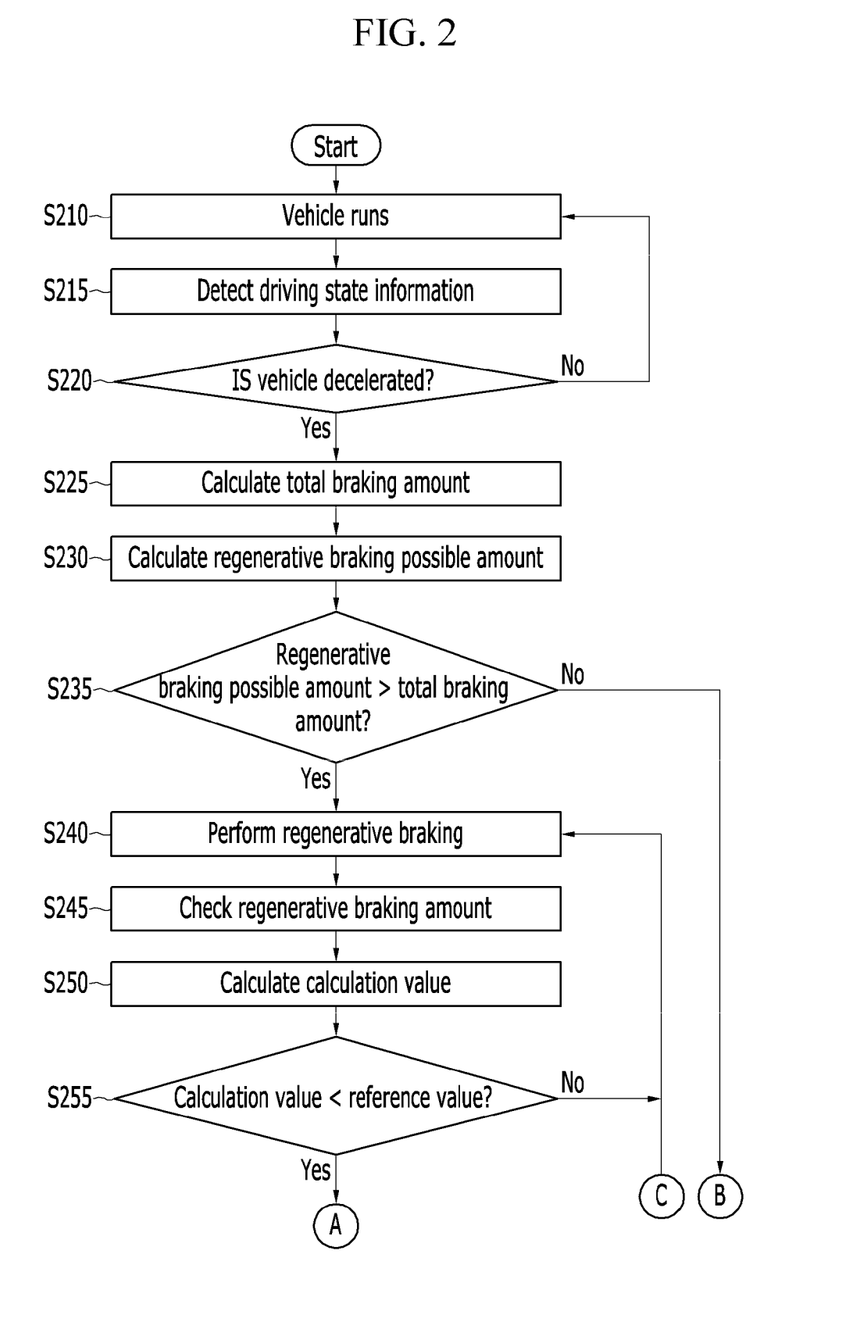
FIG. 2 and FIG. 3 are flowcharts illustrating a method of controlling regenerative braking of a vehicle.
Figure 3:
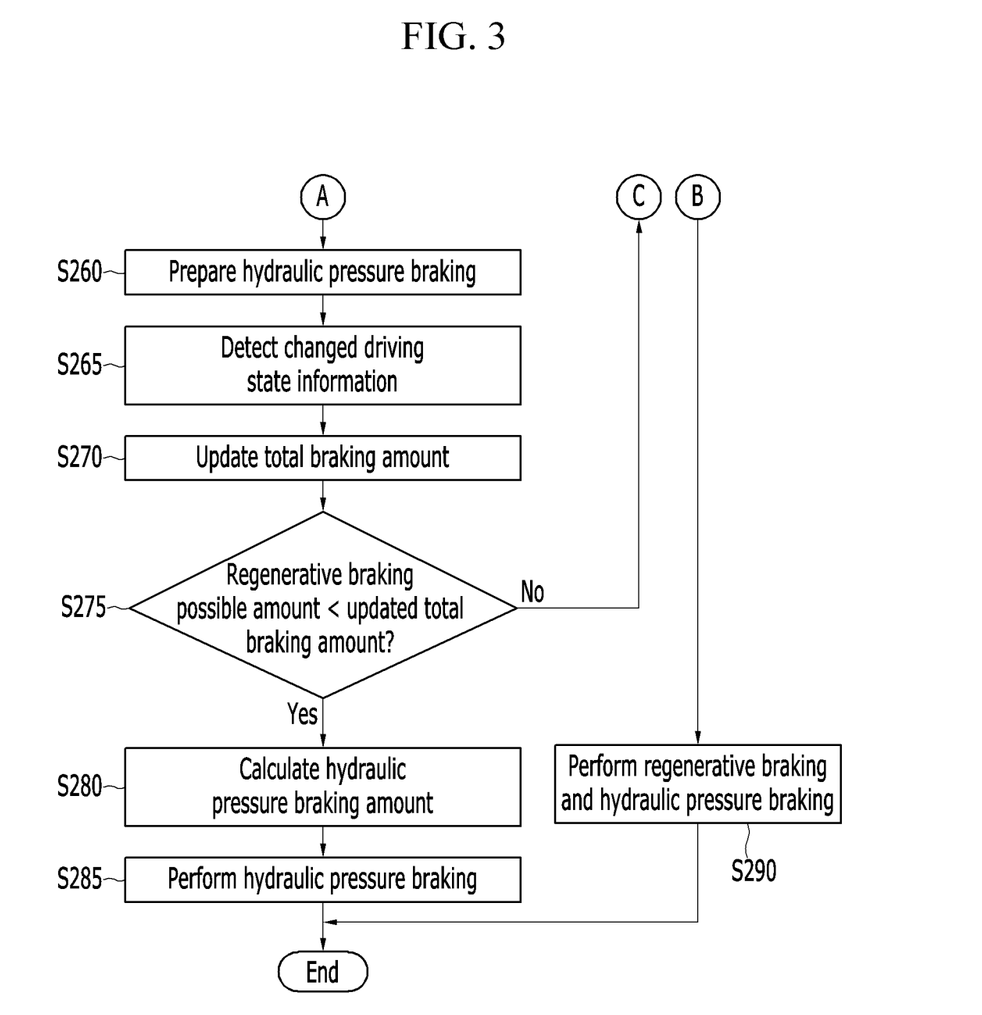
Figure 4:
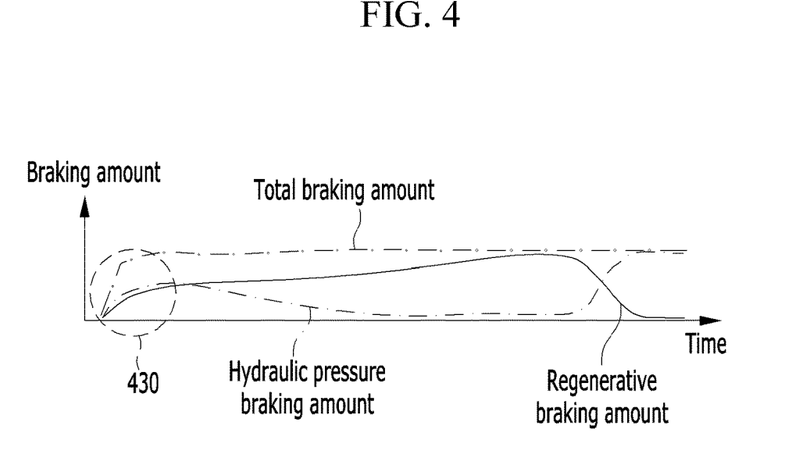
FIG. 4 is a graph for explaining a method of controlling regenerative braking of a vehicle.
Figure 5:
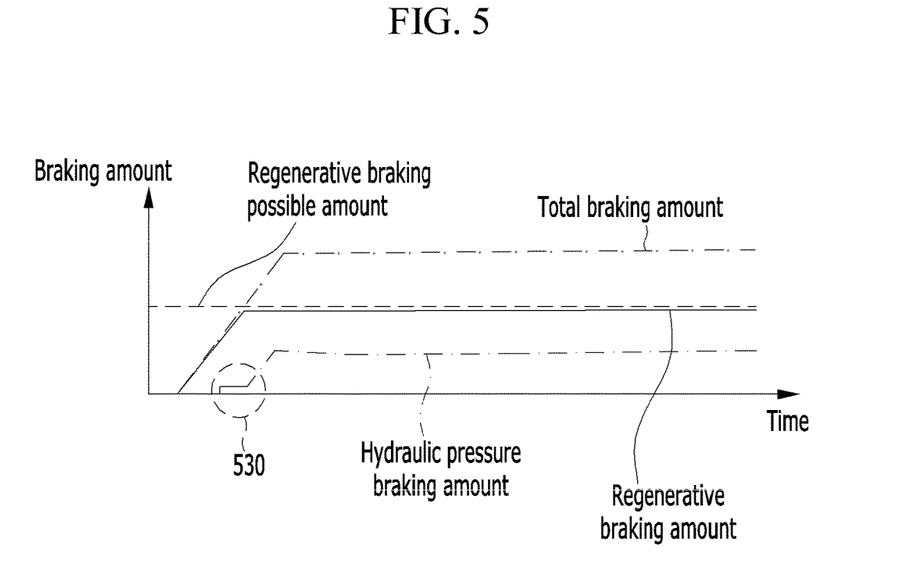
FIG. 5 is a graph for explaining a method of a hydraulic pressure braking.

FIG. 2 and FIG. 3 are flowcharts illustrating a method of controlling regenerative braking of a vehicle in an exemplary form of the present disclosure. FIG. 4 is a graph for explaining a method of controlling regenerative braking of a vehicle in one exemplary form of the present disclosure. FIG. 5 is a graph for explaining a method of a hydraulic pressure braking as an exemplary form of the present disclosure.

Referring to FIG. 2 and FIG. 3, a vehicle travels when a driver turns on the engine at step S210. That is, the HCU 200 controls at least one of the engine 100 and the drive motor 120 such that the vehicle travels when the engine starts.

The data detector 60 detects the driving state information including a position value of a brake pedal and a vehicle speed at step S215. The data detector 60 transmits the driving state information to the HCU 200.

The HCU 200 determines whether the vehicle is decelerated based on the driving state information at step S220. At this time, the HCU 200 may determine that the vehicle is decelerated based on the vehicle speed.

In the step S220, when the vehicle is not decelerated, the HCU 200 moves to step 210.

The EBU 190 calculates the total braking amount when the vehicle is decelerated at step S225. That is, the EBS 190 calculates the total braking amount by using the position value of the brake pedal in accordance with the control signal of the HCU 200.

The HCU 200 calculates the regenerative braking possible amount at step S230. In detail, the HCU 200 receives the generatable power of the drive motor from the MCU 160, and receives the chargeable power of the battery from the BMS 170. The HCU 200 calculates the regenerative braking possible amount by using the generatable power of the drive motor, the chargeable power of the battery and the consumed power at the electrical device. That is, the HCU 200 may determine the regenerative braking possible amount as a smaller one between values by subtracting the consumed power at the electrical device from the generatable power of the drive motor and the chargeable power of the battery.

The generatable power of the drive motor may mean a power in which the drive motor 120 can generate considering temperature. And the chargeable power of the battery may mean a power in which the batter can charge considering SOC of the battery and temperature, etc. The electrical device may include HSG (hybrid starter and generator), FATC (Full Automatic Temperature Control System), and LDC (Low-Voltage DC-DC Converter).

The HCU 200 calculates the regenerative braking possible amount by using the generatable power of the drive motor, the chargeable power of the battery, the hand over ratio and the consumed power at the electrical devices when gear-shift is occurred at the transmission 140. In detail, the HCU 200 calculates the hand over ratio, and calculates the regenerative braking possible amount by using the hand over ratio, the generatable power of the drive motor, the chargeable power of the battery, and the consumed power at the electrical device.

The HCU 200 determines whether the regenerative braking possible amount is greater than the total braking amount at step S235. Here, the HCU 200 determines that the regenerative braking possible amount is greater than the total braking amount in order to early enter the regenerative braking.

The ECU 200 performs the regenerative braking when the regenerative braking possible amount is greater than the total braking amount at step S240. That is, the HCU 200 performs the regenerative braking by controlling the MCU 160 when the regenerative braking possible amount is greater than the total braking amount. As can be seen in 430 of FIG. 4, the HCU 200 early performs regenerative braking.

The MCU 160 checks the regenerative braking amount when the regenerative braking is performed at step S245.

The HCU 200 calculates the calculation value by using the regenerative braking possible amount and the regenerative braking amount at step S250. That is, the HCU 200 calculates the calculation value by subtracting the regenerative braking amount from the regenerative braking possible amount received from the MCU 160.

The HCU 200 determines whether the calculation value is less than a reference value at step S255. The reference value may mean a value for preparing the hydraulic pressure braking and may be predetermined.

The HCU 200 moves to the step S240 when the calculation value is equal or greater than the reference value.

The HCU 200 prepares the hydraulic pressure braking when the calculation value is less than the reference value at step S260. That is, the HCU 200 controls the EBS 190 for preparing the hydraulic pressure braking when the calculation value is less than the reference value. The EBS 190 supplies the hydraulic pressure to a brake cylinder of the each driving wheel such that the brake pad and the brake disk become a state of a kiss point. Herein, the kiss point means a state where friction between the brake disk and the brake pad is started.

Referring to FIG. 5, a reference numeral 530 denotes the state where friction between the brake disk and the brake pad is started.

Since the response of the hydraulic pressure is slow, it is possible to obtain responsibility by applying a remaining hydraulic pressure of the braking hydraulic pressure to the brake cylinder when total braking amount is greater than the regenerative braking amount The data detector 60 detects the changed driving state information by the driver at step S265. That is, the data detector 60 detects changed position value of the brake pedal when the position value of the brake pedal is changed by the driver. The data detector 60 transmits the position value of the brake pedal to the HCU 200.

The EBS 190 updates the total braking amount based on the changed driving state information at step S270. That is, the EBS 190 updates the total braking amount based on the changed position value of the brake pedal controlled by the HCU 200.

The HCU 200 determines whether the regenerative braking possible amount is less than the updated total braking amount at step S275.

When the regenerative braking possible amount is greater than the updated total braking amount, the HCU 200 moves to the step S240.

The HCU 200 controls the EBS 190 for calculating the hydraulic pressure braking amount when the regenerative braking possible amount is less than the updated total braking amount at step S280. The EBS 190 calculates the hydraulic pressure braking amount by subtracting the regenerative braking possible amount from the updated total braking amount.

The EBS 190 performs the hydraulic pressure braking based on the hydraulic pressure braking amount at step S285. That is, the EBS 190 performs the hydraulic pressure braking by controlling the hydraulic pressure supplied to the brake cylinder of each driving wheel based on the hydraulic pressure braking amount.

The regenerative braking and the hydraulic pressure braking are performed at step S290 when the regenerative braking possible amount is less than the total braking amount. In other words, the HCU 200 controls the MCU 160 such that the regenerative braking is performed and controls the EBS 190 such that the hydraulic pressure braking is performed when the regenerative braking possible amount is less than the total braking amount.

As described above, in the exemplary forms of the present disclosure, the regenerative braking possible amount is calculated based on the generatable power of the drive motor and the chargeable power of the battery, and it is possible to early enter the regenerative braking when the regenerative braking possible amount is greater than the total braking amount based on the position value of the brake pedal such that fuel efficiency can be improved. Further, since the hydraulic pressure braking is pre-prepared, desired braking force of the driver can be obtained.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A regenerative braking control apparatus of a vehicle comprising:
    a drive motor;
    a battery configured to provide driving voltage to the drive motor;
    a data detector configured to detect driving state information of the vehicle; and
    a vehicle controller configured to:
        generate a total braking amount based on the driving state information,
        generate a regenerative braking possible amount based on a generatable power of the drive motor and a chargeable power of the battery,
        perform a regenerative braking when the regenerative braking possible amount is greater than the total braking amount, and
        prepare a hydraulic pressure braking based on the regenerative braking possible amount and a regenerative braking amount based on the regenerative braking,
    wherein the vehicle controller is configured to:
        calculate a calculation value based on the regenerative braking possible amount and the regenerative braking amount,
        prepare the hydraulic pressure braking by supplying a hydraulic pressure to a brake cylinder connected with a brake pad when the calculation value is less than a reference value, and
        control a brake system configured to supply the hydraulic pressure to the brake cylinder connected with the brake pad until the brake pad and a brake disk are a state of a kiss point.

2. The regenerative braking control apparatus of claim 1, wherein
    when the vehicle controller receives a changed driving state information from the data detector, the vehicle controller is configured to update the total braking amount based on the changed driving state information, and
    to calculate a hydraulic pressure braking amount based on the updated total braking amount and the regenerative braking amount when the regenerative braking possible amount is less than the updated total braking amount.

3. The regenerative braking control apparatus of claim 2, wherein
    the vehicle controller is configured to calculate the hydraulic pressure braking amount by subtracting the regenerative braking amount from the updated total braking amount, and to perform the hydraulic pressure braking based on the hydraulic pressure braking amount.

4. The regenerative braking control apparatus of claim 1, wherein
    the vehicle controller is configured to calculate the regenerative braking possible amount based on the generatable power of the drive motor, the chargeable power of the battery and a consumed power by electrical devices.

5. The regenerative braking control apparatus of claim 1, wherein
    the vehicle controller is configured to calculate a hand over ratio when a shift stage is changed in a transmission, and to calculate the regenerative braking possible amount based on the generatable power of the drive motor, the chargeable power of the battery, the hand over ratio, and a consumed power by electrical devices.

6. The regenerative braking control apparatus of claim 5, wherein
    the electrical devices include at least one of a hybrid starter and generator (HSG), a full automatic temperature control system (FATC), and a low-voltage DC-DC Converter (LDC).

7. The regenerative braking control apparatus of claim 1, wherein
    the vehicle controller is configured to perform the regenerative braking and the hydraulic pressure braking when the regenerative braking possible amount is equal to or less than the total braking amount.

8. A method of controlling regenerative braking of a vehicle, the method comprising:
    calculating, by a vehicle controller, a total braking amount based on driving state information;
    calculating, by the vehicle controller, a regenerative braking possible amount based on a generatable power of a drive motor and a chargeable power of a battery;
    determining, by the vehicle controller, whether the regenerative braking possible amount is greater than the total braking amount;
    performing, by the vehicle controller, the regenerative braking when the regenerative braking possible amount is greater than the total braking amount; and
    preparing, by the vehicle controller, a hydraulic pressure braking based on a regenerative braking amount based on the regenerative braking possible amount and the regenerative braking,
    wherein the preparing the hydraulic pressure braking includes:
    calculating a calculation value based on the regenerative braking possible amount and the regenerative braking amount;
    determining whether the calculation value is less than a reference value;
    supplying a hydraulic pressure to a brake cylinder connected with a brake pad when the calculation value is less than the reference value, and
    wherein in the preparing the hydraulic pressure braking, the hydraulic pressure is supplied to the brake cylinder connected with the brake pad until the brake pad and a brake disk are a state of a kiss point.

9. The method of claim 8, wherein
    in the calculating the regenerative braking possible amount, the regenerative braking possible amount is calculated based on the generatable power of the drive motor, the chargeable power of the battery, and a consumed power by electrical devices.

10. The method of claim 8, wherein the calculating the regenerative braking possible amount includes:

determining whether a gear-shift is changed in a transmission;

determining a hand over ratio based on a gear-shift stage of the transmission when the gear-shift is changed in the transmission; and calculating the regenerative braking possible amount based on the hand over ratio, the generatable power of the drive motor, the chargeable power of the battery, and the consumed power by the electrical devices.

11. The method of claim 8, wherein the calculation value is calculated by subtracting the regenerative braking amount from the regenerative braking possible amount.

12. The method of claim 8, further comprising:

after preparing the hydraulic pressure braking, updating, by the vehicle controller, the total braking amount based on a change to the driving state information;

calculating, by the vehicle controller, a hydraulic pressure braking amount by subtracting the regenerative braking amount from the updated total braking amount when the regenerative braking possible amount is less than the updated total braking amount; and performing, by the controller, the hydraulic pressure braking based on the hydraulic pressure braking amount.

13. The method of claim 8, further comprising:

performing the regenerative braking and the hydraulic pressure braking when the regenerative braking possible amount is equal to or less than the total braking amount after determining whether the regenerative braking possible amount is greater than the total braking amount.

\* \* \* \* \*